(12) United States Patent
Taft et al.

(10) Patent No.: US 6,966,145 B1
(45) Date of Patent: Nov. 22, 2005

(54) FIRE ANT TRAP

(76) Inventors: Michael Taft, 1414 Salem Church Rd., Elizabeth City, NC (US) 27909; Marylee B. Taft, 1414 Salem Church Rd., Elizabeth City, NC (US) 27909

( * ) Notice: Subject to any disclaimer, the term of this patent is extended or adjusted under 35 U.S.C. 154(b) by 3 days.

(21) Appl. No.: 10/825,505

(22) Filed: Apr. 15, 2004

(51) Int. Cl.[7] .................. A01M 17/00; A01M 1/20; A01M 1/10
(52) U.S. Cl. ..................... 43/132.1; 43/107
(58) Field of Search .............. 43/132.1, 124, 43/131, 107, 900; 47/29.1, 29.2, 29.3, 29.4, 47/29.5, 29.6, 29.7, 30, 48.5; 111/7.1, 7.2, 111/7.3, 7.4, 118

(56) References Cited

U.S. PATENT DOCUMENTS

| | | | | |
|---|---|---|---|---|
| 310,982 A * | 1/1885 | Brown | ........ | 47/29.5 |
| 551,527 A * | 12/1895 | Cunningham | ........ | 111/7.1 |
| 1,280,486 A * | 10/1918 | Kanst | ........ | 47/48.5 |
| 1,290,544 A * | 1/1919 | Graumann | ........ | 43/124 |
| 1,485,924 A * | 3/1924 | Hobbs | ........ | 47/30 |
| 1,868,235 A * | 7/1932 | Jaden | ........ | 111/7.3 |
| 1,877,979 A * | 9/1932 | Savage | ........ | 43/131 |
| 1,937,172 A * | 11/1933 | Starner et al. | ........ | 111/7.1 |
| 1,960,464 A * | 5/1934 | Thalheimer | ........ | 43/131 |
| 1,979,541 A * | 11/1934 | Gunn | ........ | 111/7.1 |
| 1,991,930 A * | 2/1935 | Hope | ........ | 111/7.1 |
| 2,028,688 A * | 1/1936 | Rugg et al. | ........ | 111/7.1 |
| 2,172,574 A * | 9/1939 | Campbell | ........ | 111/7.1 |
| 2,209,731 A * | 7/1940 | Holmes | ........ | 111/7.3 |
| 2,333,727 A * | 11/1943 | Lucas | ........ | 111/7.1 |
| 2,375,860 A * | 5/1945 | Markham | ........ | 47/48.5 |
| 2,595,782 A * | 5/1952 | Epstein | ........ | 47/48.5 |
| 2,753,662 A * | 7/1956 | Behnke | ........ | 47/29.2 |
| 2,841,923 A * | 7/1958 | Dickison | ........ | 111/7.1 |
| 2,874,657 A * | 2/1959 | Austin | ........ | 111/7.1 |
| 2,906,056 A * | 9/1959 | Youngblood | ........ | 43/124 |
| 2,996,842 A * | 8/1961 | Weston | ........ | 47/30 |
| 3,243,962 A * | 4/1966 | Ratliff | ........ | 111/7.4 |
| 3,373,525 A * | 3/1968 | Cavataio | ........ | 47/30 |
| 3,405,669 A * | 10/1968 | Nimrick | ........ | 111/7.2 |
| 3,427,743 A * | 2/1969 | Brunner et al. | ........ | 43/131 |
| 3,772,820 A * | 11/1973 | Bond | ........ | 43/131 |
| 3,904,123 A * | 9/1975 | Fils | ........ | 111/7.1 |
| 3,968,937 A * | 7/1976 | Miller | ........ | 111/7.1 |
| 4,304,068 A * | 12/1981 | Beder | ........ | 47/29.1 |
| 4,336,666 A * | 6/1982 | Caso | ........ | 47/48.5 |
| 4,348,831 A * | 9/1982 | Chambers | ........ | 47/30 |
| 4,413,756 A * | 11/1983 | Kirley | ........ | 43/132.1 |
| 4,499,686 A * | 2/1985 | Scragg | ........ | 47/48.5 |
| 4,534,128 A * | 8/1985 | Query et al. | ........ | 43/132.1 |
| 4,597,217 A * | 7/1986 | Narita | ........ | 43/124 |
| 4,624,070 A * | 11/1986 | Query et al. | ........ | 43/132.1 |
| 4,637,161 A * | 1/1987 | Turner | ........ | 43/132.1 |
| 4,640,044 A * | 2/1987 | Varnon | ........ | 43/132.1 |
| 4,711,051 A * | 12/1987 | Fujimoto | ........ | 47/30 |
| 4,746,033 A * | 5/1988 | Morellini | ........ | 43/131 |
| 4,756,118 A * | 7/1988 | Evans, II | ........ | 43/132.1 |
| 4,768,306 A * | 9/1988 | Hilbun | ........ | 43/132.1 |
| 4,833,818 A * | 5/1989 | Berta | ........ | 43/132.1 |

(Continued)

Primary Examiner—Darren W. Ark
(74) Attorney, Agent, or Firm—Mills Law Firm PLLC

(57) ABSTRACT

A fire ant trap for eradicating fire ants at a mound includes a domed enclosure having a lower rim peripherally engaging the mound and secured thereat by stakes. A tubular auger is threaded at the top end and has a perforated beveled tip that rotates into the top of the mound. A fire ant agent is dispensed to the tip from an upper fill opening that is sealed by a removable cap.

14 Claims, 4 Drawing Sheets

U.S. PATENT DOCUMENTS

| | | | | |
|---|---|---|---|---|
| 5,031,355 A | * | 7/1991 | Ryan | 43/130 |
| 5,054,231 A | * | 10/1991 | Witherspoon | 43/132.1 |
| 5,099,598 A | * | 3/1992 | Carter | 43/132.1 |
| 5,109,628 A | * | 5/1992 | Ellefson | 43/124 |
| 5,109,629 A | * | 5/1992 | King et al. | 43/132.1 |
| 5,152,097 A | * | 10/1992 | Rhodes | 43/132.1 |
| 5,154,018 A | * | 10/1992 | Livingston | 43/125 |
| 5,165,199 A | * | 11/1992 | Tallon | 43/132.1 |
| 5,246,675 A | * | 9/1993 | Castronovo | 43/900 |
| 5,319,878 A | * | 6/1994 | Moffett et al. | 43/132.1 |
| 5,323,566 A | * | 6/1994 | Mills | 47/30 |
| 5,325,626 A | * | 7/1994 | Jackson | 43/132.1 |
| 5,394,643 A | * | 3/1995 | Schmittmann | 43/124 |
| 5,419,077 A | * | 5/1995 | Tombarelli | 43/132.1 |
| 5,502,920 A | * | 4/1996 | Takaoka | 43/132.1 |
| 5,509,229 A | * | 4/1996 | Thomasson et al. | 47/29.2 |
| 5,561,942 A | * | 10/1996 | Mugno et al. | 43/124 |
| 5,613,320 A | * | 3/1997 | Thomasson et al. | 47/32.1 |
| 5,632,115 A | * | 5/1997 | Heitman | 43/132.1 |
| 5,746,021 A | * | 5/1998 | Green | 43/131 |
| 5,842,305 A | * | 12/1998 | Liao | 43/107 |
| 5,870,852 A | * | 2/1999 | Stanley | 43/132.1 |
| 5,870,853 A | * | 2/1999 | Williams | 43/131 |
| 5,873,193 A | * | 2/1999 | Jensen | 43/131 |
| 5,881,493 A | * | 3/1999 | Restive | 43/132.1 |
| 5,896,700 A | * | 4/1999 | McGough | 47/48.5 |
| 5,918,410 A | * | 7/1999 | Knuppel | 43/131 |
| 5,937,572 A | * | 8/1999 | Neumann | 43/132.1 |
| 5,970,653 A | * | 10/1999 | Liang et al. | 47/30 |
| 6,026,609 A | * | 2/2000 | Rawls | 43/132.1 |
| 6,079,149 A | * | 6/2000 | Hastings | 43/132.1 |
| 6,088,953 A | * | 7/2000 | Morgan | 47/29.6 |
| 6,202,367 B1 | * | 3/2001 | Marino et al. | 47/30 |
| 6,205,702 B1 | * | 3/2001 | Ammons | 43/132.1 |
| 6,219,961 B1 | * | 4/2001 | Ballard et al. | 43/131 |
| 6,220,525 B1 | * | 4/2001 | McSherdon | 43/132.1 |
| 6,233,868 B1 | * | 5/2001 | Hahn et al. | 47/30 |
| 6,308,454 B1 | * | 10/2001 | Powell | 43/132.1 |
| 6,311,427 B1 | * | 11/2001 | McNally | 47/29.3 |
| 6,367,197 B1 | * | 4/2002 | Saye | 47/48.5 |
| 6,397,516 B1 | * | 6/2002 | Su | 43/132.1 |
| 6,412,218 B2 | * | 7/2002 | Lee | 47/48.5 |
| 6,467,216 B2 | * | 10/2002 | McManus et al. | 43/131 |
| 6,516,561 B1 | * | 2/2003 | Mancini | 47/48.5 |
| 6,526,692 B2 | * | 3/2003 | Clark | 43/107 |
| 6,604,318 B1 | * | 8/2003 | Cassidy | 43/132.1 |
| 6,609,330 B1 | * | 8/2003 | Heitman | 43/132.1 |
| 6,637,151 B1 | * | 10/2003 | Tillman | 43/900 |
| 6,655,079 B1 | * | 12/2003 | Bernard et al. | 43/131 |
| 6,796,082 B1 | * | 9/2004 | Duston et al. | 43/131 |
| 2001/0054248 A1 | * | 12/2001 | Neumann | 43/132.1 |
| 2002/0078621 A1 | * | 6/2002 | Jones | 43/124 |
| 2002/0095856 A1 | * | 7/2002 | McManus et al. | 43/131 |
| 2003/0131523 A1 | * | 7/2003 | Rawls | 43/132.1 |

* cited by examiner

FIRE ANT TRAP

FIELD OF THE INVENTION

The present invention relates generally to the eradication of insects and, in particular, to an eradicant dispensing trap for fire ants.

BACKGROUND OF THE INVENTION

Fire ant infestation is spreading rapidly along the southern and gulf coast areas where the warm and humid climates are well suited for propagation. The fire ants are extremely voracious and pose significant economic problems to crops, foliage, livestock, and agricultural operations. The fire ants are also aggressive when disturbed, swarming and stinging the source and resulting in burning pains and itching pustules. While not generally resulting in serious permanent injury to non-allergic individuals, the presence of fire ant colonies and fear of attack oftentimes results in an abandonment of the colonized area.

Various devices and chemical and heat treatments have been developed for controlling existing colonies. Many, however, are large and complex best suited for use by professional operators and not suited for consumer residential use. Where fire ant traps and bait stations have be targeted for consumer use, they have fallen short of accounting for all the complexities in effectively eradicating the colony.

The fire ants live below ground in a network of chambers and tunnels evidenced on the surface by mound that may be several inches in height and feet in diameter. When disturbed by traps and bait stations implanted at the mound, such as disclosed in U.S. Pat. No. 5,746,021 to Green, and U.S. Pat. No. 5,325,626 to Jackson, the fire ants are not confined and tend to swarm toward the applicator inflicting bites. Moreover, the implanting may cause the colony to abandon the site. Accordingly, the queen may exit the mound and reestablish a new colony at a proximate location. Further, the devices may be dislodged providing access to potentially toxic and irritating compounds, posing particular problems to children and pets. Additionally, the eradicating agents employed can be rendered ineffective in the presence of precipitation.

Accordingly, it would be desirable to provide a device usable by non-professionals that could be safely and securely installed at the mound, that would prevent abandonment of reproductive ants and queens, and that would allow dispensing of the eradicating agents without alarming the colony to the point of abandonment, would promote transfer of the agents throughout the colony, and would not be subject to reduction in efficacy in the presence of varying environmental conditions.

BRIEF SUMMARY OF THE INVENTION

The present invention provides a fire ant trap fulfilling the above objectives wherein an cover is placed over the mound with an outer ring engaging the periphery thereof thereby providing a walled barrier limiting escape. The cover is provided with sliding stakes for securing the cover in place. The peripheral attachment is minimally invasive to the mound and does not promote aggressive or abandoning activity. The stake attachment also prevents dislodging after installation to the resultant benefit of children and pets. The top of the cover is provided with a treaded collar for receiving a tubular auger having a perforated end section with a beveled tip. When the auger is threaded into the collar the tip rotates and advances thereby locally disturbing the soil and attracting the ants. After tip insertion, the desired eradication agent is dispensed through the auger passage for transfer by the ants to the colony resulting in the destruction of the colony in a short period of time, a day or less. After use, the stakes may be raised and stored on the cover, and the trap stored or moved to a subsequent site.

DESCRIPTION OF THE DRAWINGS

The above and other features and advantages of the invention will become apparent upon reading the following detailed description taken in conjunction with the accompanying drawings in which.

DETAILED DESCRIPTION OF THE PREFERRED EMBODIMENT

Figure 1:
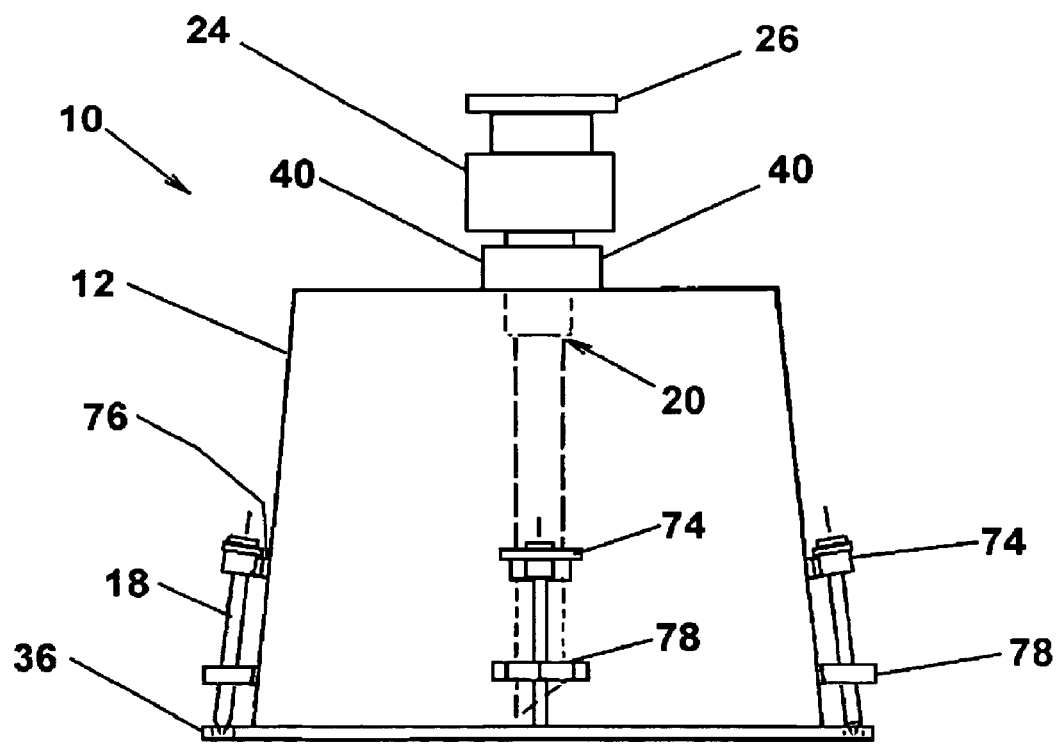
FIG. 1 is a side elevational view of a fire ant trap in accordance with a preferred embodiment of the invention.
Figure 3:
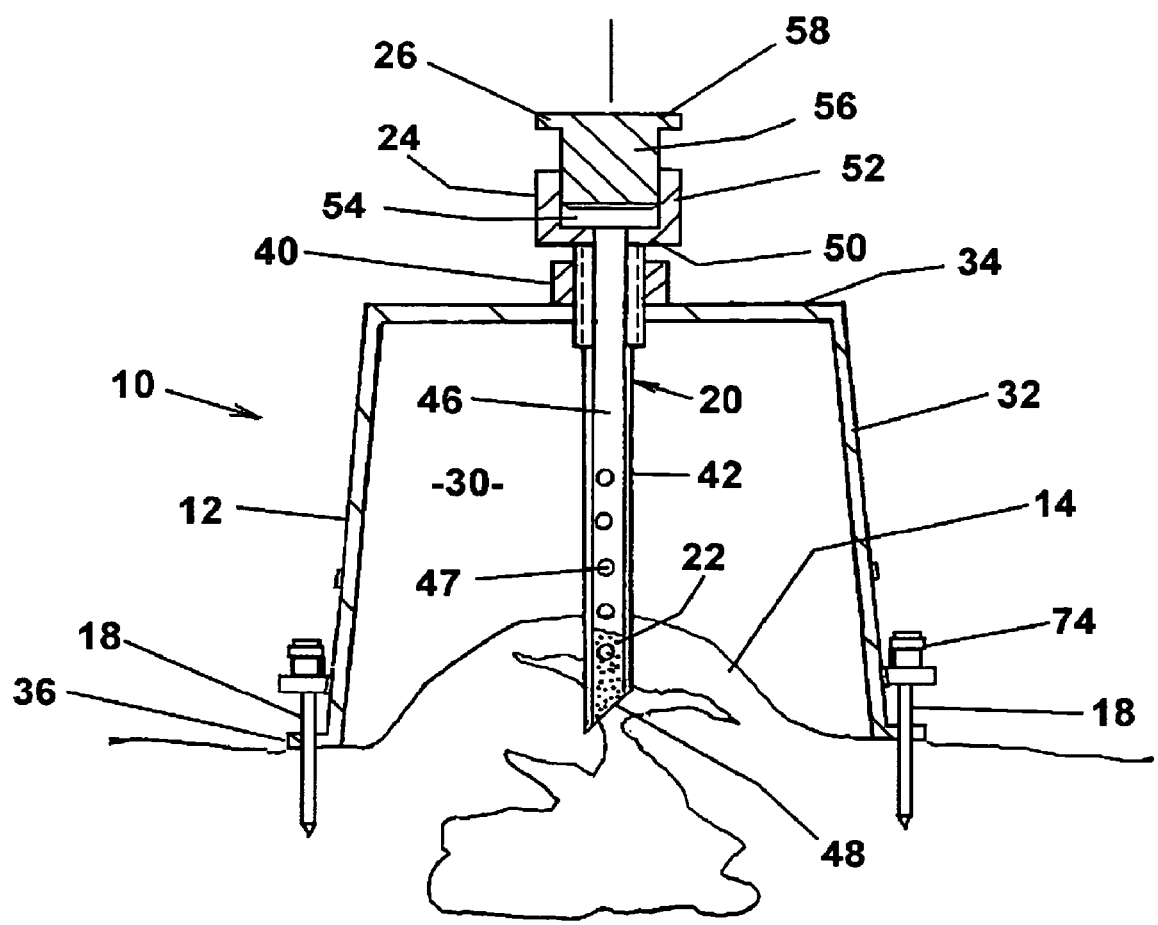
FIG. 3 is a side cross sectional view of the fire ant trap of FIG. 1 disposed over a fire ant mound with the dispensing auger in the dispensing position.

Referring to the drawings, FIGS. 1 and 3 illustrates a fire ant trap 10 including a thin wall domed cover 12 overlying a fire ant mound 14. The cover 12 is peripherally secured to the ground 16 around the mound 14 by a plurality of circumferentially spaced stakes 18. The cover 12 carries a telescoping dispensing auger assembly 20 for penetrating and disturbing the top of the mound 12 and for distributing a species appropriate eradicating agent 22 through a dispensing collar 24 sealed by a removable plug 26. Such agents specific to fire ants are available in granular, liquid and powdered form, as well as the active ingredients in bait matrices. After installation, the fire ants carry the agent interior of the mound for the common ingestion by the colony for the ultimate eradication of the ant colony, including the queen within a period of days, while preventing the escape of the species, inadvertent dislodging of the cover, access to the pesticide by children or pets, or pesticide loss from precipitation. After eradication, the stakes 18 may be withdrawn and stowed on the cover, and the trap stored compactly for reuse.

The cover 12 is thin wall, one-piece plastic member forming an inverted downwardly opening cavity 30 defined by a frustoconical side 32 upwardly terminating with a circular top 34 and downwardly terminating at an annular rim including an outwardly turned annular flange 36. The cover may take varying sizes and shapes depending on the size of the mounds to be treated. It has been determined that a cavity of about 12 inches will handle a significant portion of mounds likely to be encountered in residential. Even if the mound size is larger, the cover encompasses sufficient area to limit escape. The top 34 is provided with a coaxial opening for receiving and mounting the auger assembly 20.

Figure 2:
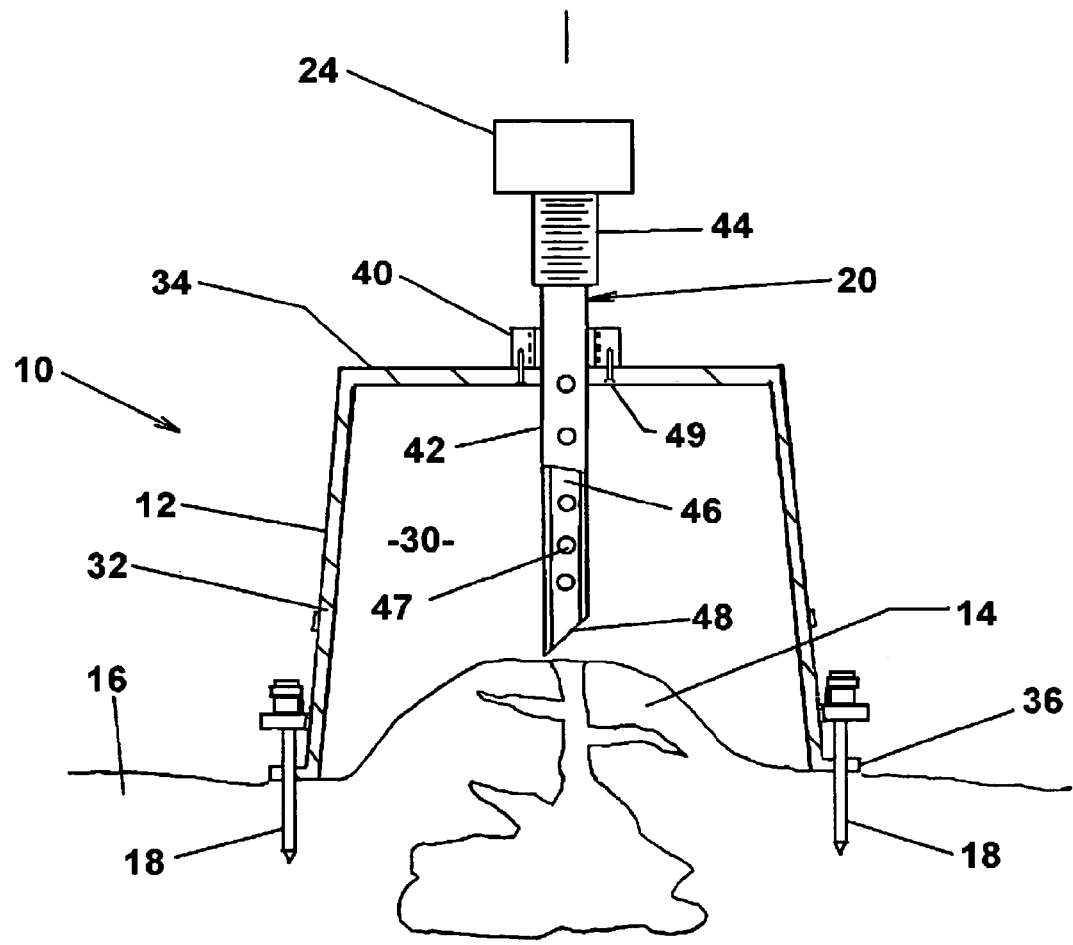
FIG. 2 is a side cross sectional view of the fire ant trap disposed over the fire ant mount with the dispensing auger in the raised position.

Referring additionally to FIG. 2, the auger assembly 20 comprises a cylindrical mounting collar 40 having a coaxial threaded bore, a beveled and perforated cylindrical auger 42 having an upper end connected with the dispensing collar 24 at an externally threaded sleeve 44 received in the threaded bore of the collar, and the plug 26 carried by the dispensing collar 24. The auger 42, sleeve 44 and collar 24 form a center vertical passage 46 for dispensing pesticide introduced at the collar 24. The auger 42 is provided with a plurality of perforations 47 and a beveled end tip 48. The perforations 47 permit dispersion of the agent 22 as well as ant access thereto. The beveled end tip 48 allows for initial penetration of the top of the mound without significant disturbance and upon rotation and gradual auguring if the mound soil. A bevel angle in the range of about 30° to 60° is preferred. Alternatively, the sleeve 44 and the bore in the collar may provide non-threaded sliding fits whereby the bevel end tip is manually lowered and rotating for achieving the above effect. The tip 48 in the lowered position is proximate the plane of the flange 36 and preferably slightly thereabove, thus limiting the penetration of the mound and providing assembly storage within the confines of the cover envelope.

The collar 40 is formed of a plastic material and attached on the upper surface of the top 34 by fasteners 49 coaxial with the opening therein. Alternatively, the collar 40 may be formed integrally with the cover.

The dispensing collar 24 and the sleeve 44 are integrally formed of a plastic material. The collar 24 has and annular base 50 registering with the passage 46 and an upwardly extending cylindrical sidewall 52, the inner surfaces of which define an upwardly opening cavity 54 for receiving the agent 22. The plug 26 is a one-piece plastic molding having solid cylindrical tip 56 having a light compressive fit with the side wall 52 and an enlarged circular shoulder 58 for manual gripping by the operator for insertion and removal, whereby in the closed position, the passage 46 is sealed to prevent exit by the enclosed fire ants.

Figure 4:
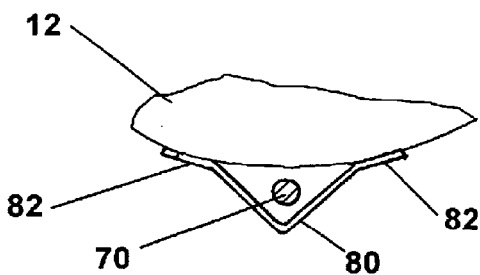
FIG. 4 is an enlarged fragmentary cross sectional view of the stake guide bracket taken along line 4—4 in FIG. 1.
Figure 5:
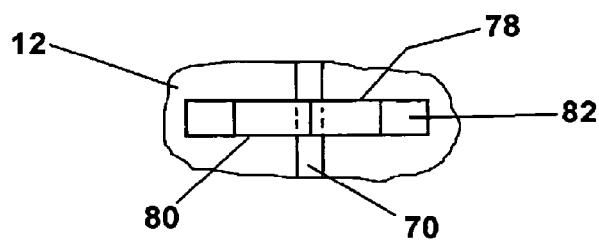
FIG. 5 is an enlarged fragmentary side view of the stake guide bracket as shown in FIG. 4.
Figure 6:
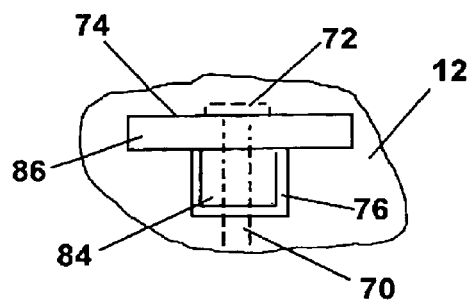
FIG. 6 is an enlarged fragmentary front view of the stake removal handle.
Figure 7:
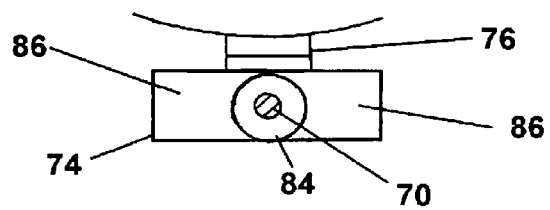
FIG. 7 is a bottom view of the stake removal handle as shown in FIG. 6.

The stakes 18 are disposed about the periphery of the side wall 32 of the cover 12. Each stake 18 includes a pointed shank70 and enlarged head 72. The shank 70 is inserted through a center opening on a removal handle 74. In the raised position, the handle 74 is releasably attached to the side 32 by a hook and loop fastener assembly 76. One part of the assembly is adhesively attached to the handle 74 and the other part is adhesively attached to the side wall. The lower end of the shank 70 is received through a guide 78 attached at the lower end of the side wall 32. The tip of the shank registers with a hole formed in the flange 36. As shown in FIGS. 4 and 5, the guide 78 includes generally V-shaped center section 80 with outwardly extending legs 82 attached to the side wall of the cover. The center section provides an enlarged vertical passage having a substantial clearance with the shank permitting flexible alignment for installing the stakes while limiting movement in the raised position. Referring to FIGS. 6 and 7 the handle 74 includes a center cylindrical hub 84 having a center vertical hole for slidably receiving the shank 70 of the stake 18. Tabs 86 extend laterally from the hub 84 and provide gripping surfaces for manually removing an embedded stake. For inserting the stakes, the handle 74 is outwardly shifted to separate the fastener assembly 76 and the stake vertically oriented and manually or mechanically embedded in the ground until the head 72 and handle 74 engage the guide 78, thereby securing the cover over the mound to prevent inadvertent dislodging, access to the pesticide by children or pets, and material degradation from precipitation.

For installation and eradication of the colony, the cover 12, with the auger assembly 20 loosen or removed, is centered over the mound 14 and the stakes 18 embedded. The auger assembly 20 is then inserted in the collar 40 whereby the beveled end tip 48 lances into the upper portion of the mound. Thereafter, the auger assembly 20 is rotated whereby the sleeve 44 is threaded into the collar 40, thereby rotating and axially downwardly advancing the tip 48 resulting in an auguring of the mound soil disturbing and attracting the ants to the surface. Next, the agent 22 is dispensed into the collar 24 and downwardly through central passage 46 allowing the ants to access the agent 22 at the end or through the perforations 47. After dispensing, the plug 26 is inserted into the collar 24 thereby sealing the cavity 30. The trap 10 then remains securely in place, resisting dislodging movement, preventing unwanted access to the agent by children and pets and escape of the ants, shielding the agent from moisture degradation. In a day or so, the stakes 18 may be removed and stowed in the raised position at the fastener assembly 76, and the trap 10 conveniently stored or used at additional infestation sites.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

What is claimed:

1. A fire ant trap for applying a fire ant control agent at a mound projecting above the ground, said fire ant trap comprising: a thin walled enclosure having surfaces defining a downwardly opening cavity terminating at a lower rim for engaging a periphery of the mound; projecting means for embedding in the ground and for attaching said enclosure at said mound; an opening in a top portion of said enclosure surrounded by an annular collar; a tubular member having an axial passage slidably disposed in said opening, said tubular member having an upper end and an angled lower end, said tubular member being movable between a raised position entirely within said cavity in said enclosure wherein said lower end is above said lower rim and said mound and a lower position wherein said lower end is within said cavity, is above said lower rim, and penetrates said mound; threaded coupling means cooperating between said upper end of said tubular member and said collar when said tubular member is in said lower position such that rotation of said tubular member thereat concurrently axially advances and rotates said lower end into engagement with said mound thereby disturbing said mound and attracting the fire ants; filling means connected with said upper end of said tubular member communicating with said passage for receiving fire ant eradicating agent and delivering the agent for distribution at said lower end of said tubular member at the mound; and means associated with said filling means for closing said passage to prevent escape of the fire ants therethrough.

2. A fire ant trap for eradicating fire ants in a mound projecting above the ground, said fire ant trap comprising: a cover member having an exterior wall forming a downwardly opening cavity and terminating with a peripheral rim for engaging and surrounding a periphery of the mound; a plurality of stake members carried on said exterior wall and moveable between a raised stowed position and a lowered position for embedding in the ground to secure the cover member at the mound; releasable means cooperating between said stake members and said cover member for maintaining said stowed position; an opening at the top of the cover member communicating with said cavity; a tubular member having a center passage extending through said opening, said tubular member having an end portion having a plurality of passages to said center passage and terminating with a beveled tip portion; coupling means cooperating between said tubular member and said cover member to provide for lowering and rotating said tubular member from an upper position and a lower position during which said beveled tip portion penetrates and mechanically disrupts an upper portion of the mound; a dispensing opening in said tubular member above said cover member for receiving an eradicating agent effective against fire ants for dispersing said agent through said center passage to the end portion of the tubular member for access by fire ants in the mound; and a cover for sealing the dispensing opening.

3. The fire ant trap as recited in claim 2 wherein said coupling means includes a threaded bore at said opening at the top of the cover member and a threaded section on said tubular member inter-engaging with said threaded bore and wherein said is concurrently axially moved and said tip portion is rotated upon rotation of said tubular member.

4. The fire ant trap as recited in claim 3 wherein said dispensing opening is formed at an upwardly opening cavity at an upper end of said tubular member.

5. The fire ant trap as recited in claim 4 wherein said cover includes a plug section engaging the surfaces of the upwardly opening cavity for sealing said dispensing opening.

6. The fire ant trap as recited in claim 2 wherein said threaded bore is formed at an annular collar surrounding said opening at the top of the cover member.

7. The fire ant trap as recited in claim 2 wherein said beveled tip portion is located above said peripheral rim in said upper position.

8. The fire ant trap as recited in claim 2 wherein said releasable means comprises a hook and loop fastening assembly.

9. The fire ant trap as recited in claim 2 wherein each of said stake members comprises an elongated cylindrical pointed shank having an enlarged head at an upper end thereof.

10. The fire ant trap as recited in claim 9 including a release handle slidably disposed on each said shank and manually operable for raising each said stake member from said lowered position.

11. The fire ant trap as recited in claim 10 wherein said rim includes an outwardly extending annular flange having apertures for guiding said shanks of said stakes in movement between said raised stowed position and said lowered position.

12. The fire ant trap as recited in claim 11 including guide means projecting outwardly from said cover member above said flange for guiding said shanks.

13. The fire ant trap as recited in claim 2 wherein said beveled tip portion is located above said peripheral rim in said lower position.

14. A method for eradicating fire ants at a mound projecting above ground, said method comprising the steps of: placing an enclosure over said mound having a downwardly opening cavity and a peripheral rim engaging a periphery of the mound; mechanically attaching said enclosure to said ground; inserting an elongated tubular auger assembly having a central axial passage and a beveled tip into said cavity through an opening formed in a top portion of said enclosure; axially downwardly shifting said beveled tip into a top portion of said mound and thereafter rotating said tip to disturb said mound to thereby attract the fire ants thereto; dispensing a fire ant eradicating agent into said passage to said tip; sealing said passage; and removing said enclosure from said mound after eradicating said fire ants.

\* \* \* \* \*